P. GODLEVSKI.
INSECT EXTERMINATOR.
APPLICATION FILED FEB. 12, 1913.
1,127,880.
Patented Feb. 9, 1915.
3 SHEETS—SHEET 1.
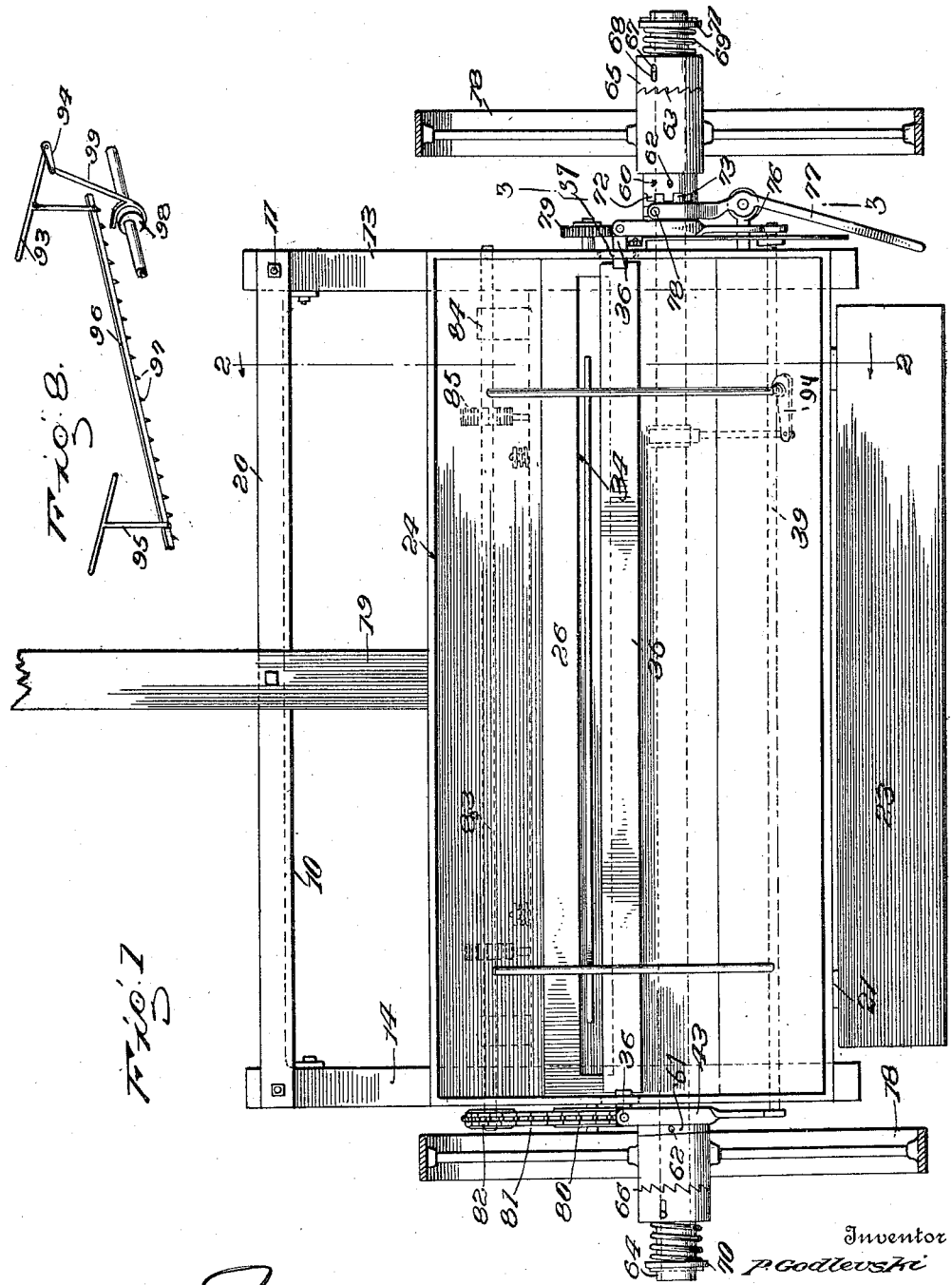

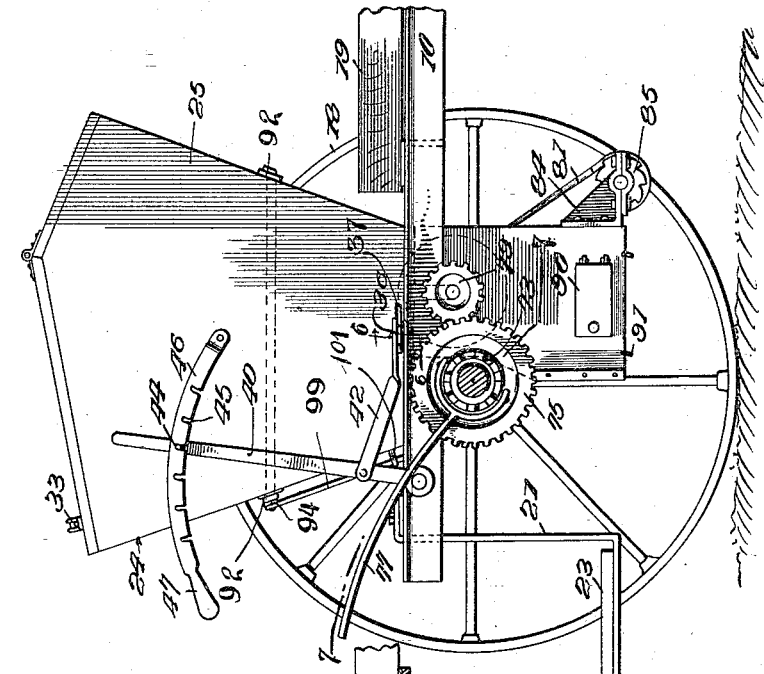

P. GODLEVSKI.
INSECT EXTERMINATOR.
APPLICATION FILED FEB. 12, 1913.
1,127,880.
Patented Feb. 9, 1915.
3 SHEETS—SHEET 3.
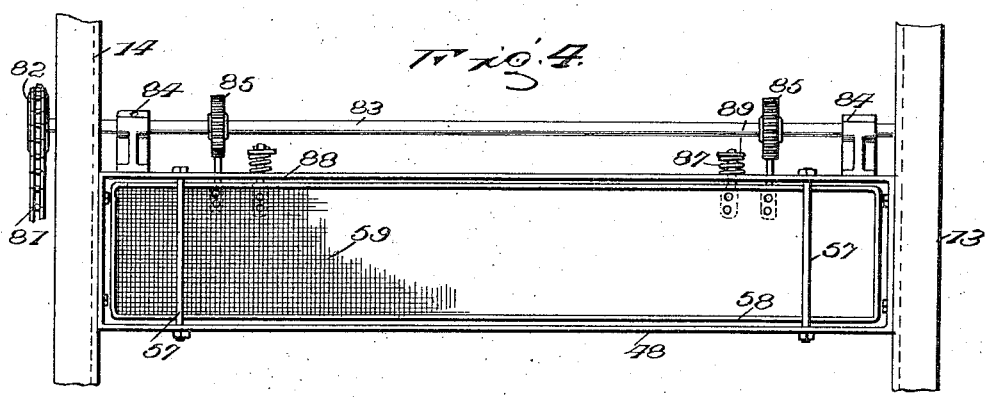
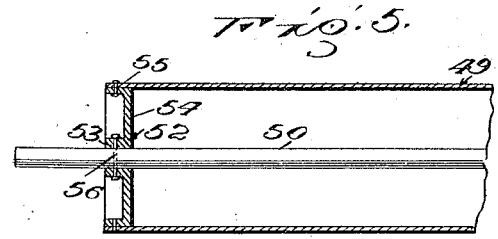
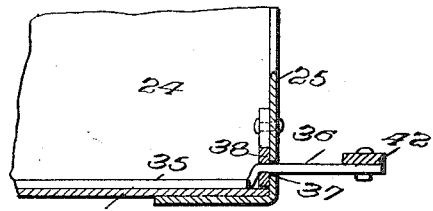
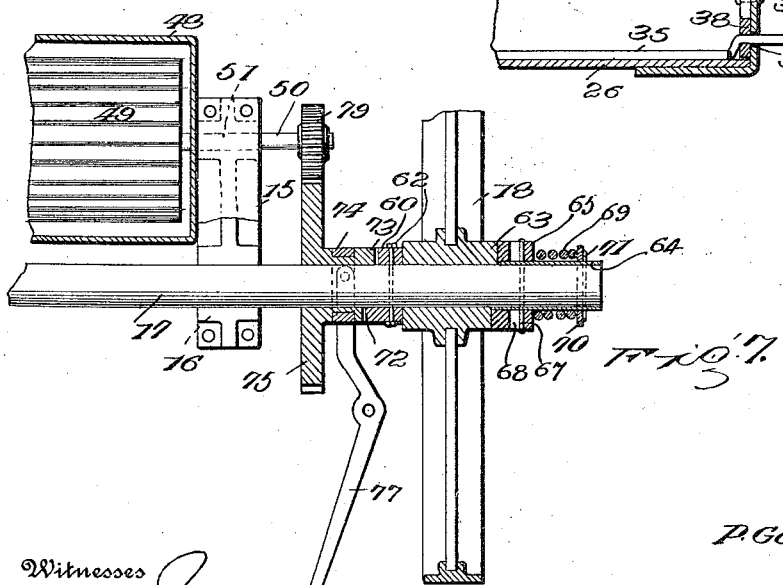
Inventor
P. Godlevski
Witnesses
By
Attorneys.

UNITED STATES PATENT OFFICE.

PAUL GODLEVSKI, OF SUNBURY, PENNSYLVANIA.

INSECT-EXTERMINATOR.

1,127,880.    Specification of Letters Patent.    Patented Feb. 9, 1915.

Application filed February 12, 1913. Serial No. 748,002.

*To all whom it may concern:*

Be it known that I, PAUL GODLEVSKI, a citizen of the United States, residing at Sunbury, in the county of Northumberland and State of Pennsylvania, have invented certain new and useful Improvements in Insect-Exterminators, of which the following is a specification.

My invention relates to new and useful improvements in insect exterminators and more particularly to that type of exterminator employed in treating growing grain to protect it from insects by dusting the ground after the grain is planted with ground lime or other suitable insecticide, and the object of my invention is to provide a machine which will evenly distribute the lime, thus not only avoiding waste through uneven distribution, but also avoiding danger of killing the growing plants by burning out the ground in spots, due to an excess of lime.

A further object of my invention is to provide a machine of the above described type which may be employed with equally good results as a guano, salt or other spreader.

A further object of my invention is to provide means for adjustably varying the amount of lime or other substance being spread.

With these and other objects in view, my invention will be more fully described, illustrated in the accompanying drawings, and then specifically pointed out in the claims which are attached to and form a part of this application.

In the drawings: Figure 1 is a top plan view of my machine with the top of the lime holding hopper removed to show the sliding gate or closure governing the feeding of the lime from the hopper and with the supporting wheels in section to more clearly illustrate the drive mechanism; Fig. 2 is a vertical section on the line 2—2 of Fig. 1, looking in the direction of the arrows and clearly illustrating the lime feeding mechanism and the vibrating screen or shaker by means of which the lime is spread; Fig. 3 is a section on the line 3—3 of Fig. 1, showing the machine as a whole in side elevation and also showing details of the clutch mechanism by means of which the power is transmitted from the axle to the distributing drum and vibrator to actuate the same; Fig. 4 is a fragmentary sectional view on the line 4—4 of Fig. 2; Fig. 5 is a fragmentary longitudinal sectional view of the distributing drum employed in my machine; Fig. 6 is a fragmentary sectional view on the line 6—6 of Fig. 3, illustrating certain details in the sliding gate construction; Fig. 7 is a fragmentary sectional view taken on the line 7—7 of Fig. 3, illustrating the manner in which the supporting wheels are mounted upon the axle and the clutches co-acting therewith, this figure also showing the manner in which the axle and drive shaft of the machine are journaled in bearings carried by a common bracket; Fig. 8 is a detached perspective view of the mechanism employed to prevent clogging of the lime or other material as it is fed from the hopper.

Corresponding and like parts are referred to in the following description and indicated in all the views of the drawings by the same reference characters.

The preferred embodiment of my invention consists primarily of a wheeled supporting frame carrying a hopper provided with a feed mechanism which may be readily governed to control the feed of lime or other material from the hopper and a vibrating screen or shaker positioned to receive the lime or other material as it is fed from the hopper and to spread the same evenly over the ground, the feed mechanism and vibrator being driven by a common shaft which is in turn driven by the axle.

The body proper of the machine includes a substantially rectangular shaped frame 10, preferably formed of angle iron and suitably bolted, riveted or otherwise fastened as shown at 11 and provided adjacent its forward end with a brace 12 extending from one side of the frame to the other. The side members 13 and 14 of this frame each carry a downwardly depending bracket 15 having a bearing 16 providing journals for the axle 17. Supporting wheels 18 of any preferred type are loosely mounted upon the ends of the axle in such a manner as to normally turn the axle during the forward movement of the machine in a way which will be hereinafter explained. A draft tongue 19 is bolted or otherwise secured to the central portion of the front member 20 of the frame and the frame members 12, while downwardly depending hangers 21 carried by the rear member 22 of the frame support a platform 23 upon which the driver may stand while operating the machine.

Seated upon the top of the frame 10, slightly in advance of the axle and extending completely across the frame, is a trough shaped hopper 24. The ends 25 of this hopper are preferably formed of wood, while the bottom 26 and front and rear sides 27 and 28 are preferably formed of sheet metal, the lower edges of the front and rear walls being turned inwardly to support the bottom which is riveted to the inturned portions of said walls, while the upper edges are inturned to support a top 29 formed in two parts hingedly connected as at 30, one of these parts 31 being rigidly secured to the hopper, while the other part 32 is unconnected to the hopper and forms a swinging closure through which the lime or other material may be supplied to the hopper, this top portion 32 being preferably provided with a handle 33 by means of which it may be raised. The bottom 26 of this hopper is provided with a feed slot 34 which extends from one side of the hopper to the other and through which the lime or other material passes. The amount of material passing through this feed slot is governed by a sliding gate or closure 35 which rests flatly upon the upper face of the bottom 26, being somewhat greater in width than the width of the feed slot and having upwardly and outwardly directed ears 36 at its ends which are movable in horizontally disposed slots 37 formed in the end walls of the hopper. Sliding closures 38 are mounted on these ears between the body portion of the gate and the end walls of the hopper and are provided with openings just sufficient in size to permit the passage of the ears. These closures 38 bear against the inner faces of the side walls of the hopper and form a closure for the slots 37, thus preventing any leaking of lime through the slots.

A rocker shaft 39 is mounted for rotation in the side members of the frame adjacent their rear ends and carries at one end a hand lever 40 and at its other end a crank arm 41. A link 42 pivotally connects the intermediate portion of the hand lever 40 with the adjacent ear 36 of the closure or gate 35, while a similar link 43 similarly connects the free end of the crank arm 41 with the opposite ear of the gate. It will therefore be apparent that by swinging the hand lever 40 rearwardly, the gate may be drawn to expose a greater portion of the slot, while by swinging the lever forwardly the gate may be closed to any desired extent. In order to hold the gate in adjusted position, the hand lever is provided adjacent its free end with a pin 44 adapted to seat in any one of a plurality of notches 45 formed in the lower edge of an arcuate rack bar 46, one end of which is pivoted to the side member 25 of the hopper and the other end of which terminates in a handle 47. It will of course be apparent that this rack bar may be swung about its pivot point to disengage the pin 44 and permit the desired movement of the lever 40 to adjust the gate when it may be released to engage the pin and lock the gate in adjusted position.

Disposed immediately below the hopper and in fact bearing by its open upper end against the bottom of the same, is a vertical chute 48 which incloses the feeding and spreading mechanism of the machine and which also serves to prevent blowing of the lime or other material being scattered, the lower end of this chute extending to within a few inches or a foot of the ground and being open to permit the passage of the lime.

The feeding mechanism of this machine comprises a cylindrical drum 49 which is mounted to rotate with a shaft 50, the ends of which are journaled in bearings 51 carried by the brackets 15. As best shown in Figs. 2, 5 and 7 of the drawings, this drum consists of a tubular body portion formed of sheet metal and corrugated or ribbed longitudinally throughout its length, the body member being supported upon and secured to the axle by castings 52, each of which includes a hub 53 and radially directed spokes 54 having laterally formed shoulders 55 at their free ends to which the body portion is bolted or riveted, the hubs of the castings being secured to the shaft 50 by bolts 56. The shaft 50 carrying this feed drum is so disposed as to position the drum directly beneath the feed slot 34 of the hopper and the corrugations or flutes formed between the ribs are so proportioned that when the drum is revolved at a suitable rate of speed, the lime or other material will pass into the corrugations and be carried by the drum and finally deposited in the chute as clearly illustrated in Fig. 2 of the drawings. This drum should preferably be positioned so close to the bottom of the hopper that even when the gate is fully opened, no lime or other material will be able to pass from the hopper except that carried in the flutes and by the ribs of the drum, the drum therefore furnishing an absolute limit for the amount of material fed from the hopper, while the gate provides for adjusting the feed of material to the drum.

The chute 48 is provided adjacent its lower end and at each side with a pair of vertically spaced apart tie rods 57 forming supporting guides for the frame of a screen 58, the bottom of which is formed of foraminous material 59 of any suitable mesh depending upon the material to be spread. This screen is so proportioned as to extend entirely across the chute from one side to the other, but fits loosely between the front and rear walls of the hopper as shown in Fig. 2, this loose fitting of the screen permitting the same to be vibrated to uniformly scatter the lime, salt or other material fed to it by the drum.

As previously pointed out, the axle 17 is rotatably mounted in its bearings and is normally driven by the supporting wheels 18 during movement of the machine, the revolving axle in turn driving the feeding drum and vibrating the screen. To accomplish this, the supporting wheels are mounted upon the axle in a peculiar manner, the wheels being held against inward movement along the axle by means of collars 60 and 61 which are secured to the axle by bolts 62. The outer ends of the wheel hubs are each formed with radially disposed clutch teeth 63, the forward faces of which are inclined as shown.

Mounted upon the free ends of the axle are sleeves 64 upon which are slidably mounted clutch members 65 having clutch teeth 66 adapted for locking engagement with the teeth 63 of the wheel hub. The sliding movement of these clutch members 65 is limited by pins 67 extending through longitudinally formed slots 68 of the clutch members, through the sleeves 64 and into the axle. These pins also lock the clutch members against rotation independent of the axle. The slots 68 are sufficient in length to permit the disengagement of the teeth 63 and 66 but the clutch members are normally held in innermost position and therefore in locking engagement with the wheels by means of helical springs 69 positioned over the ends of the axle and held in place by collars 70 and pins 71, the normal tension of these springs, when so secured, being sufficient to hold the clutch members in active position.

The inner face of the collar 60 is provided with a plurality of radially disposed clutch teeth 72 adapted for locking engagement with similar clutch teeth 73 formed upon the outer end of the hub 74 of a spur gear 75 which is freely mounted upon the axle. A bracket 76 extends from the adjacent side member of the frame 10 and pivotally mounted intermediate its length upon this bracket, is a hand lever 77, one end of which is operatively connected to the hub 74 of the gear 75 as shown at 78, this hand lever serving as a means for throwing the above described clutch in and out of position.

A spur gear 79 is keyed upon one end of the shaft 50 in such a position as to mesh with the gear 75 when the latter is moved to bring its clutch member into engagement with the clutch collar 60. A sprocket wheel 80 is keyed upon the opposite end of the shaft 50 and a chain 81 is trained over this sprocket wheel and over a sprocket wheel 82 which is keyed upon one end of a shaft 83 disposed parallel to the shaft 50 and journaled in bearings 84 carried by the forward lower portion of the chute 48. One or more ratchet gears 85 are keyed upon this shaft 83 and the screen 58 is provided with forwardly directed pins 86 which engage against the teeth of the ratchet gears, being held in constant engagement therewith by the tension of helical springs 87 surrounding rods 88 carried by the screen frame and extending through the front wall of the chute, these springs bearing between the chute and heads 89 of the rods to normally hold the screen in advance position with its pins 86 engaging the base of the ratchet teeth as shown in Fig. 2 of the drawings. It will therefore be apparent that upon the rotation of the shaft 83, these pins will be intermittently forced rearwardly to move the screen rearwardly and then released when the springs 87 will immediately draw the screen forwardly, this resulting in a rapid vibration of the screen.

The side walls of the chute 48 are preferably provided immediately above the vibrating screen with doors 90 of any suitable construction which are normally closed but which may be opened to permit cleaning of the screen, if necessary. If desired, the lower end of the chute may be provided with a plurality of hooks 91 upon which may be stretched and supported a strip of canvas or other fabric to form a continuation of the chute for use during windy weather to prevent undue blowing of the lime or other material being spread by the machine, although in most instances this will not be found necessary.

In operation, the hopper 24 is filled with the ground lime, guano, salt or other material with which the ground is to be treated and the cover 32 closed. The lever 40 is then actuated to open the gate to such an extent as to feed the desired quantity of the lime or other material to the feeding drum and the lever 77 manipulated to throw the clutch into active position and the gear 75 into mesh with the gear 79. The machine is then drawn about the field in the usual manner, the operator standing upon the platform at the rear of the machine to drive the horses and at the same time adjust the spreading of the lime or other material by such manipulation of the gate as may be necessary. The revolving of the supporting wheels act through their teeth and the teeth of the clutch members or sleeves 65 to revolve the shaft which in turn revolves the gear 75 which is locked to the shaft by its clutch teeth and the clutch teeth of the collar 60. As this gear 75 meshes with the gear 79 of the shaft 50, said shaft will be rotated in a direction opposite to the rotation of the wheels to rotate the feeding drum and consequently convey the ground lime or other material to the chute. The rotation of this shaft 50 also drives the shaft 83 and the ratchet gears carried by this shaft engaging against the extending pins of the vibrating screen, together with the springs, normally supporting the screen in advance position, cause a rapid vibration of the screen which effectually spreads the lime or other material delivered into the chute over the ground beneath the machine. As the feeding and spreading of the lime or other material is directly proportional to the rate of speed at which the machine travels, it will be apparent that a uniform spreading of the lime over the ground will be accomplished, irrespective of the rate at which the machine is driven. The springs 69 are of sufficient strength to lock the clutch sleeves 65 into engagement with the teeth of the wheel hubs under normal conditions, and consequently cause rotation of the axle to operate the machine in the above described manner but at the same time if the machine becomes clogged for any reason, the added load thus put upon the axle will overcome the tension of the springs 69 and the inclined faces of the co-acting teeth will cause the clutch sleeves 65 to move outwardly toward the ends of the axle and permit the wheels to rotate idly, thus avoiding all danger of breaking delicate parts of the machine.

From the foregoing description, it will be apparent that I have provided an extremely simple and effective form of insect exterminator and one by means of which the ground lime or other material with which the earth is being treated may be automatically and evenly spread, irrespective of the rate of speed at which the machine is operated. It will further be apparent that I have provided an extremely simple and effective means for feeding predetermined quantities of the lime to the spreader mechanism proper to suit various conditions and that this mechanism is so arranged that any lumps of lime will be thoroughly broken up before they pass to the screen.

Although I have fully described the details of construction of a particular form of machine, it will of course be understood that these details may be changed at any time, within the scope of the appended claims, without in the slightest degree departing from the spirit of my invention.

In order to prevent the lime or other material used from clogging the feed slot in the bottom of the hopper, I have provided the front and rear walls of the hopper adjacent their ends with bearings 92 in which are journaled rearwardly extending, spaced apart parallel shafts 93, the rear end of one of which projects through the rear wall of the hopper and carries a crank arm 94. These shafts 93 are each provided intermediate their length with a downwardly depending arm 95 and pivoted between the free ends of these arms, is a bar 96 carrying a plurality of teeth 97, the arms 95 and bar 96 being so proportioned and arranged as to extend longitudinally of the feed slot 34 and immediately above the same.

An eccentric cam 98 is mounted upon the axle 17 and a lever 99 is pivoted by one end to the free end of the crank arm 94 and provided with a laterally directed fork 100 at its opposite end for engagement with the cam 98, the lever being held against disengagement from the cam by an eye bolt 101 carried by the hopper and through which the lever is movable.

From the foregoing description of the device, it will be apparent that a rotation of the axle will cause the lever 99 to reciprocate vertically and so rock the shaft 93 carrying the crank arm. The rocking of this shaft causes the bar 96 to reciprocate transversely of the hopper and break up any lumps of lime or other material contained therein previous to its passage through the slot. It will therefore be apparent that the lime or other material will not only be in a finely divided condition upon its passage from the hopper, but that the above device will also serve to prevent any clogging of the slot.

Having thus described the invention, what is claimed as new is:

1. A machine of the character described including a hopper provided with a slot in its bottom, a closure movable to open the slot for any desired extent, a drum positioned beneath the slot and provided with longitudinal grooves to receive the contents of the hopper, means for rotating the drum, a screen positioned below the drum, and means operable by the rotation of the drum for vibrating the screen, said means including springs normally holding the screen in one position, pins extending from the screen, a shaft driven by the drum, and ratchet gears carried by the shaft and engaging the pins.

2. A machine of the character described including a hopper provided with a slot in its bottom, a chute positioned below the hopper, a feeding mechanism mounted in the chute adjacent the hopper, a distributing mechanism mounted in the chute below the feeding mechanism, a closure for the slot slidable over the bottom of the hopper and with its ends extending through the sides thereof, and means connected to said ends for manipulating said closure.

3. A machine of the character described including a hopper provided with a slot in its bottom, a chute positioned below the hopper, a feeding mechanism mounted in the chute adjacent the hopper, a distributing mechanism mounted in the chute below the feeding mechanism, a closure for the slot slidable over the bottom of the hopper and with its ends extending through the sides thereof, and means for manipulating said closure, said means including a crank shaft, a hand lever on the shaft and links connecting the lever and crank with the extended ends of the closure.

4. A machine of the character described including a hopper, a chute positioned below the hopper, means for variably feeding the contents of the hopper to the chute, spaced rods extending across the chute, a screen mounted for vibratory movement on said rods, rods extending from the screen through one wall of the chute and terminating in heads, helical springs surrounding said rods and bearing between the chute and the heads of the rods, pins extending from the screen through one wall of the chute, and means for intermittently exerting pressure against said pins.

5. A machine of the character described including a hopper, a chute positioned below the hopper, means for variably feeding the contents of the hopper to the chute, spaced rods extending across the chute, a screen mounted for vibratory movement on said rods, rods extending from the screen through one wall of the chute and terminating in heads, helical springs surrounding said rods and bearing between the chute and the heads of the rods, pins extending from the screen through one wall of the chute, and means for intermittently exerting pressure against said pins, said means including a rotatable shaft, ratchet gears mounted on the shaft with their teeth engaging the pins, and means for rotating the shaft.

6. A machine of the character described including a hopper provided with a slot in its bottom, a drum positioned beneath the slot, means for rotating the drum, a screen positioned below the drum, springs normally holding the screen in one position, and means driven by the drum and intermittently engaging the screen to move the same against its retaining springs.

7. A machine of the character described including a hopper provided with a slot in its bottom, a chute positioned below the hopper, a feeding mechanism mounted in the chute in alinement with the slot in the hopper, a closure for the slot slidable over the bottom of the hopper with its ends extending through slots in the sides thereof, a rock shaft, crank arms carried by the shaft, links connecting the crank arms with the ends of the closure, and a hand lever for rocking said shaft.

8. A machine of the character described including a hopper provided with slots in its bottom and sides, a chute positioned below the hopper, a distributing mechanism mounted in the chute, a closure for the slot in the bottom of the hopper slidable over the bottom and with its ends extending through the slots in the sides, means connected to the ends of the closure for reciprocating the same, and plates through which the ends extend, said plates engaging against the sides of the hopper to, at all times, close the slots therein.

In testimony whereof I affix my signature in presence of two witnesses.

PAUL GODLEVSKI. [L. S.]

Witnesses:
  I. A. DE WITT,
  MARGARET R. STROH.

Copies of this patent may be obtained for five cents each, by addressing the "Commissioner of Patents, Washington, D. C."